Feb. 4, 1969 E. A. AUTREY 3,426,198

DETECTOR ARRAY WITH ELECTRODE CONNECTIONS

Filed April 29, 1966

INVENTOR.
EVERT A. AUTREY,
BY
Neil J. Driscoll
ATTORNEY.

United States Patent Office 3,426,198

Patented Feb. 4, 1969

3,426,198
DETECTOR ARRAY WITH ELECTRODE CONNECTIONS

Evert A. Autrey, Santa Barbara, Calif., assignor to Santa Barbara Research Center, Goleta, Calif., a corporation of California Filed Apr. 29, 1966, Ser. No. 546,330
U.S. Cl. 250—83 7 Claims
Int. Cl. G01t *1/202*

ABSTRACT OF THE DISCLOSURE

A detector array comprising individual substrate modules having opposed parallel surfaces generally perpendicular to a third surface. The third surface is provided with a plurality of detector material segments. The other surfaces have electrode leads plated thereon electrically connected to each segment of detector material. In an array pattern, the modules may be offset as seen in plan view to provide convenient electrical lead connection.

The invention relates to the field of radiation detection and is particularly directed to a structural arrangement providing a high density compact array of multiple detectors.

It is well known that all objects having a temperature level above absolute zero radiate electromagnetic energy as a result of their atomic and molecular oscillations. A segment of this electromagnetic spectrum is known as the infrared region wherein the energy has frequencies below visible red and, therefore, not detectable by the human eye. It has been found that certain materials when used in thin film form are sensitive to the receipt of infrared electromagnetic energy and an electrical output is created in the material in response to receipt of the radiation. In the infrared spectrum detection certain typical materials are well known such as lead selenide or lead sulfide. While herein we will refer primarily to infrared sensors in the description of the invention, it will be understood that the structural arrangement hereinafter claimed may apply to other radiation detectors.

The infrared detection devices required in today's sophisticated search and track or guidance systems demands an array or mosaic of individual sensitive elements. The number of sensitive elements in a given system may range from a relatively few such as four or five to desirably as many as thousands in a complex mosaic pattern. The in situ physical requirements desirably demand a high density pattern of very small elements each dimensionally accurate and uniformly physically sized to present a high degree of uniform electrical characteristics.

Initially detector arrays were manufactured using relatively crude mechanical methods. Recently, however, photo-etch techniques have been developed which more accurately satisfy the close dimensional tolerances and uniformity required in modern detector arrays. Thus, the in-service demand of many bits of information per unit of time or area with resulting high resolution are satisfied by the provision of smaller detector elements in smaller areas.

Of course, each independent detector in a mosaic array must have an independent electrical circuit associated therewith. This requirement when coupled with the demand for miniaturization has made it extremely difficult to provide the electrical leads. Prior art arrays provided a substrate of glass or quartz material having electrodes extending through the substrate material to contact each individual detector on a surface thereof. This structure, of course, proved difficult to manufacture because of the tiny multiple piercing operations required as well as attendant difficulty of securing electrical wire leads to the electrodes once in position on the substrate. An alternate prior art arrangement involved spacing the detectors on the substrate surface and routing electrode leads in intermediate areas not sensitive to radiation. The spacing of the detectors, however, defeats the major purpose of high density arrangements.

It is therefore a primary object of the present invention to provide a detector array having a unique structural arrangement between the detector, per se, and the electrical electrodes connected thereto.

It is yet a further object of the invention to provide a mosaic array of the type described that is relatively inexpensive to manufacture but meets the requirement of high detector density per unit area.

It is another object of the invention to provide a detector array structure which lends itself to ease of wire lead assembly.

Specifically, the structure disclosed utilizes individual modules each having a plurality of detectors, the detector material being applied to one surface thereof and electrode material electrically joining each detector applied to an adjacent surface. The adjacent surfaces are angularly arranged relative to said one surface. A further specific feature of the invention involves the physical juxtapositioning of a plurality of modules to provide a high density array and staggering the positioned modules to provide easy access to the electrodes for wire lead attachment.

These and other objects of the invention will be apparent in the course of the following description and from an examination of the related drawings.

In the manufacture of the novel detector array certain procedures and techniques will herein be suggested, it being understood that they represent only one mode of creating the disclosed structure. Other methods of manufacture may be used to practice the disclosed invention.

Figure 1:
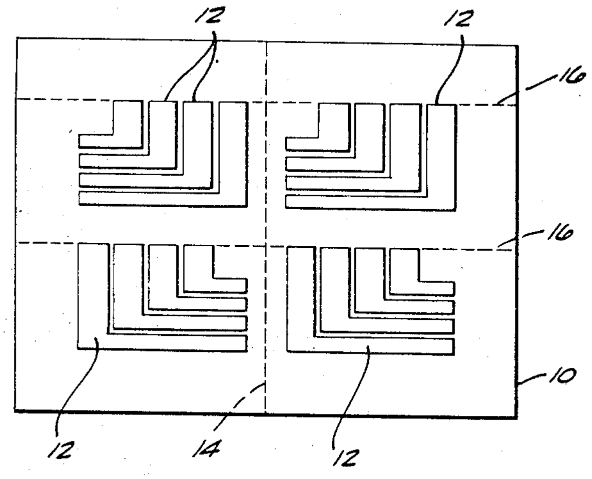
FIGURE 1 is a plan view of a typical detector substrate material having an electrode pattern applied thereto.

In FIG. 1 the numeral 10 indicates a substrate of glass or quartz material. An electrode pattern is formed thereon at 12, 12 and is preferably an electrically conductive material firmly adhering to the surface. Gold is a satisfactory electrically conductive material for this purpose.

In creating the patterns 12 on the substrate 10 a thin layer of gold may be applied over the entire surface. Thereafter, a photo-resist material is likewise applied over the gold surface.

An appropriate photo-mask having exposure openings therein conforming to the pattern 12 is then placed over the surface and exposed. The photo-resist and exposed pattern is then developed in the conventional manner and the gold from the surface 10 is etched away from the unexposed segments of the surface. Upon removal of the exposed photo-resist the patterned gold 12 remains on the surface. Each segment of the pattern 12 is, of course, electrically insulated from the other segments.

Figure 2:
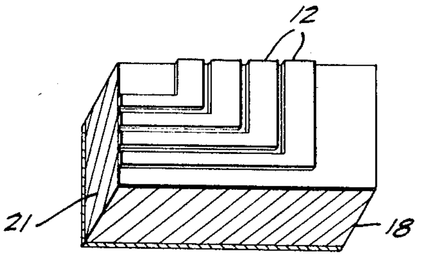
FIG. 2 is a side elevational view of a module formed from the substrate of FIG. 1 after cutting and forming of the substrate.

Thereafter, the substrate 10 may be sawed along dotted lines 14 and 16. This provides individual substrate segments as indicated at 18 in FIG. 2. It should be noted that the patterns 12 formed as shown in FIG. 1 comprise left-hand modules at the upper section of the figure and right-hand modules in the lower section of the figure.

Figure 3:
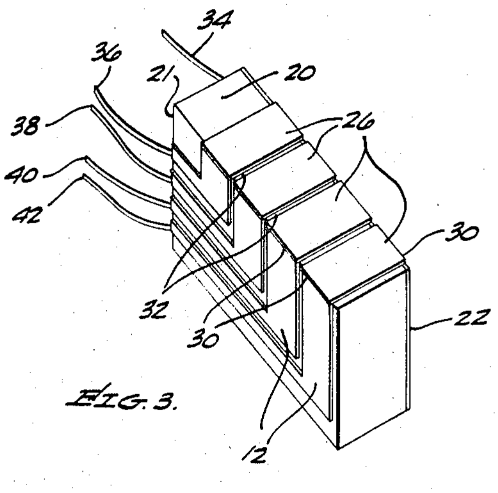
FIG. 3 is a perspective view of the module of FIG. 2 after application of the detector material.

After sawing and appropriate grinding or lapping or otherwise forming of the surfaces 20 and 21 of each module, a gold coating is applied to the entire opposed surface 22 of each module 18 as is shown in FIG. 3. This gold surface need not be patterned as it may provide a common or ground lead to the detector elements as hereinafter described.

Subsequent to module formation the sensitive detector elements are positioned on the surfaces 20 as shown at 26, 26 in FIG. 3. Where lead sulfide is employed a conventional and well-known chemical deposit mode may be utilized to achieve this structure. The detector material 26 slightly overlies the surface 28 as shown at 30, 30 to assure that a good electrical connection is provided with the related electrode pattern 12, 12. Using conventional scribing or photo-etch techniques each individual detector element may be electrically separated from the adjacent element by a space 32. Each module 18 is completed by welding or otherwise securing a common or ground lead 34 to the gold surface 22 and individual wire leads 36, 38, 40 and 42 to the independent electrodes 12. Thus, in the completed module as shown in FIG. 3, a group of four independent detectors 26 are provided on the upper surface 20 of the module. Electrodes join each of the independent detectors 26, said electrodes being formed on surfaces in perpendicular relation to the detector supporting surface 20. The patterns 12, 12 and material 26 is dimensionally exaggerated as shown in the drawings. In actual practice very thin films are employed.

While in the embodiment shown the ground electrode is shown and described as disposed on one surface 22 of the module 18 and the independent electrodes 12 on the other opposed surface, it will be readily apparent in this field that both ground electrode and lead electrodes may be applied to both surfaces by appropriate manufacture.

Figure 4:
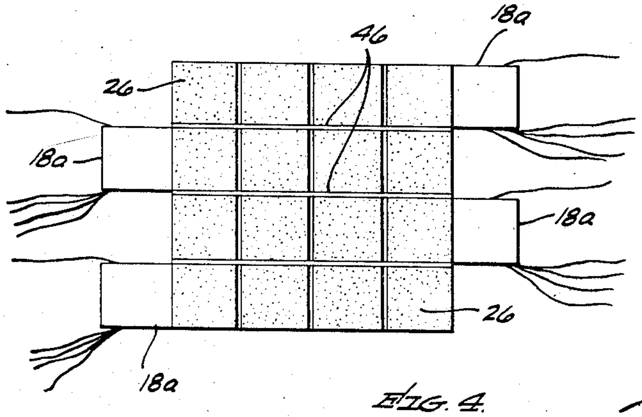
FIG. 4 is a plan view of a plurality of modules arranged in a mosaic array.

FIG. 4 illustrates in plan view a plurality of modules 18*a* arranged in mosaic pattern and in adjacent juxtaposition to each other. To prevent electrical short therebetween a thin insulating layer 46, 46 is positioned intermediate each module 18*a*. Polyethylene material of an order of approximately .001" thick thereby fits for this insulating purpose in most applications.

As an additional feature of the invention the adjacent modules 18*a* may be offset or staggered as shown in FIG. 4 so that convenient access may be provided for the electrical leads communicating therewith.

It will thus be apparent that a detector array module involving the unique concept of having detector sensitive elements deposited on a substrate edge surface rather than the flat sides has been developed. The electrode patterns are physically arranged on the side surfaces of the module and electrically connected to each sensitive element. As a result the modules may be, in effect, "stacked" in a side-by-side manner achieving a high density of detecting elements in a minimum space. Thus, a high density mosaic having the advantages of construction simplicity and ease of assembly and viewing has been provided.

The invention as shown is by way of illustration and may be modified in many particulars all within the scope of the appended claims.

I claim:

1. In a radiation detector device,
substrate means in generally planar configuration having surfaces in angular relation to each other,
radiation detector material means deposited on one of said surfaces, and
electrode means on at least one of said other surfaces and electrically joined to said material means.

2. A radiation detector device according to claim 1,
wherein the surfaces on the substrate means comprise at least three,
two of said three surfaces being in angular relation to the third,
said third surface having the material means thereon,
said two surfaces having electrode means thereon electrically joined to the material means.

3. A radiation detector device according to claim 2,
wherein the substrate means comprises a plurality of individual modules,
the material means on each module being segmented to define a plurality of detectors.

4. A radiation detector device according to claim 3,
wherein respective modules are arranged in juxtaposition to each other to provide a dense array of detectors, said modules being electrically insulated from each other.

5. A radiation detector device according to claim 4,
wherein adjacent modules in the array are offset from each other as seen in plan view.

6. A radiation detector device according to claim 5,
and including electrical lead means connected to respective electrode means.

7. A radiation detector device according to claim 6,
wherein said two surfaces are generally perpendicular to said third surface.

References Cited

UNITED STATES PATENTS

| | | |
|---|---|---|
| 3,251,995 | 5/1966 | Denney. |
| 3,267,727 | 8/1966 | Benzinger. |

ARCHIE R. BORCHELT, *Primary Examiner.*

U.S. Cl. X.R.

250—83.3